(12) United States Patent
Sharma et al.

(10) Patent No.: US 9,680,806 B2
(45) Date of Patent: Jun. 13, 2017

(54) SECURE TRANSACTIONS USING ALPHACODES

(71) Applicant: New York University, New York, NY (US)

(72) Inventors: Ashlesh Sharma, Redmond, WA (US); Lakshminarayanan Subramanian, New York, NY (US); Dennis Shasha, New York, NY (US)

(73) Assignee: NEW YORK UNIVERSITY, New York, NY (US)

( * ) Notice: Subject to any disclaimer, the term of this patent is extended or adjusted under 35 U.S.C. 154(b) by 0 days.

(21) Appl. No.: 14/734,355

(22) Filed: Jun. 9, 2015

(65) Prior Publication Data

US 2015/0365408 A1 Dec. 17, 2015

Related U.S. Application Data

(60) Provisional application No. 62/010,876, filed on Jun. 11, 2014.

(51) Int. Cl.
*H04L 29/06* (2006.01)
(52) U.S. Cl.
CPC ........ *H04L 63/061* (2013.01); *H04L 63/0464* (2013.01); *H04L 63/0876* (2013.01); *H04L 63/12* (2013.01)

(58) Field of Classification Search
CPC .................................................. H04L 36/0876
See application file for complete search history.

(56) References Cited

U.S. PATENT DOCUMENTS

| 4,733,362 | A | * | 3/1988 | Haraguchi | B65G 1/1373 206/534 |
|---|---|---|---|---|---|
| 5,365,589 | A | * | 11/1994 | Gutowitz | H04L 9/001 380/263 |
| 6,621,807 | B1 | * | 9/2003 | Jung | H04W 4/20 370/328 |
| 7,734,044 | B2 | * | 6/2010 | Fritz | H04L 29/06027 380/255 |
| 8,769,279 | B2 | * | 7/2014 | von Mueller | G06Q 20/12 705/35 |
| 2002/0095590 | A1 | * | 7/2002 | Douceur | G06F 21/6209 713/190 |

(Continued)

*Primary Examiner* — Dao Ho
(74) *Attorney, Agent, or Firm* — Foley & Lardner LLP

(57) ABSTRACT

Systems and method for sending a first alphacode to a first participant over a secure channel. Sending a second alphacode to a second participant over a secure channel. Receiving a first encoded message, a second encoded message, and a plaintext message. The first encoded message is based on the first alphacode and the second encoded message is based on the second alphacode. Generating a first ciphertext based on the first alphacode and the plaintext message. Comparing the first ciphertext to the first encoded message and determining the authenticity of the first encoded message based at least on the comparing to the first ciphertext. Comparing the second ciphertext to the second encoded message and determining the authenticity of the second encoded message based at least on the comparing to the second ciphertext. Sending a first confirmation to the first participant and sending a second confirmation to the second participant.

20 Claims, 7 Drawing Sheets

(56) References Cited

U.S. PATENT DOCUMENTS

2003/0076959 A1\* 4/2003 Chui ..................... H04K 1/00
                                                                  380/277
2007/0028088 A1\* 2/2007 Bayrak .............. H04L 63/0428
                                                                  713/150

\* cited by examiner

SECURE TRANSACTIONS USING ALPHACODES

CROSS-REFERENCE TO RELATED APPLICATIONS

This application claims the benefit of U.S. Provisional Application No. 62/010,876 filed on Jun. 11, 2014, which is hereby incorporated by reference in its entirety.

FIELD OF THE INVENTION

The present disclosure relates to securing communications over insecure communication channels using alphacodes, a paradigm that can be used in a variety of scenarios to provide authenticated communication among multiple users.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

From e-commerce transactions to email exchanges to text messaging on a phone, communicating in a secure way is taken for granted by most individuals. But a lot of communication channels are not in fact secure and can be attacked by determined adversaries. For example, communication channel security can be compromised as a result of government restrictions, corporate missteps, privacy mishaps, programming errors, etc. These mistakes or loopholes can lead to severe consequences for end users, from fraud to privacy infringement. Though secure connection within the browsers through SSL/TLS is the norm in banking and e-commerce transactions, loopholes exist.

Mobile apps can steal private information from unsuspecting users. In developing nations, where mobile banking is taking off in a big way, the underlying GSM security layer is often insecure. Systems can be vulnerable to fraud due to a variety of security loopholes. In some countries such as India, GSM encryption is banned by the government so all the SMS messages are sent in cleartext, practically an invitation to thieves. These and other risks can lead to insecure communication channels.

A need exists for providing secure interactions between mutually suspicious parties over unencrypted and insecure networks.

SUMMARY

One embodiment of the invention relates to sending a first alphacode to a first participant over a secure channel. Sending a second alphacode to a second participant over a secure channel. Receiving a first encoded message, a second encoded message, and a plaintext message. The first encoded message is based on the first alphacode and the second encoded message is based on the second alphacode. Generating a first ciphertext based at least on the first alphacode and the plaintext message. Comparing the first ciphertext to the first encoded message and determining an authenticity of the first encoded message based at least on the comparing to the first ciphertext. Comparing the second ciphertext to the second encoded message and determining an authenticity of the second encoded message based at least on the comparing to the second ciphertext. Sending a first confirmation to the first participant based on the authenticity of the first encoded message and the second encoded message. Sending a second confirmation to the second participant based on the authenticity of the first encoded message and the second encoded message.

Another embodiment of the invention relates to sending a first alphacode to a participant. Receiving a second alphacode from the participant. Receiving a first encoded message and a plaintext message over an insecure channel, where the first encoded message is based on the first alphacode. Generating a first ciphertext based at least on the first alphacode and the plaintext message. Comparing the first ciphertext to the first encoded message. Determining an authenticity of the first encoded message based at least on the comparing to the first ciphertext. Generating a second encoded message based on the second alphacode and the determined authenticity. Sending a first confirmation to the participant based on the second encoded message.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

One aspect of the present description relates to "alphacodes", a paradigm that can be used in a variety of scenarios to provide authenticated and non-forgeable communication among multiple users. A set of code tables (i.e., alphacodes) is shared among mutually trusting parties and every time one party wants to conduct a transaction the party encodes a message using the set of code tables. The transaction can go through if the counterparty, upon decoding the messages of the transaction, verifies certain constraints. Each code table from the set of code tables can be used for a single transaction. Thus, for example, man-in-the-middle attacks fail because the alphacode is not valid after the first message. Each alphacode extends the functionality of an OTM (one-time-message authentication code) for every transaction, making each transaction secure against various adversarial attacks. By encoding numbers, other symbols, or both into letters at an application level, a user can be provided security over an insecure communication channel. The alphacodes can yield an encoded message in a native alphabet that can be easily recognized by a user. Thus, for example, alphacodes are easy to apply even for semi-literate users with simple pattern recognition skills and the ability to recognize characters in their native alphabet. Building upon alphacodes, the present disclosure provides protocols that can be used in a variety of settings including, but not limited to, branchless banking and e-commerce transactions over the web.

Figure 1:
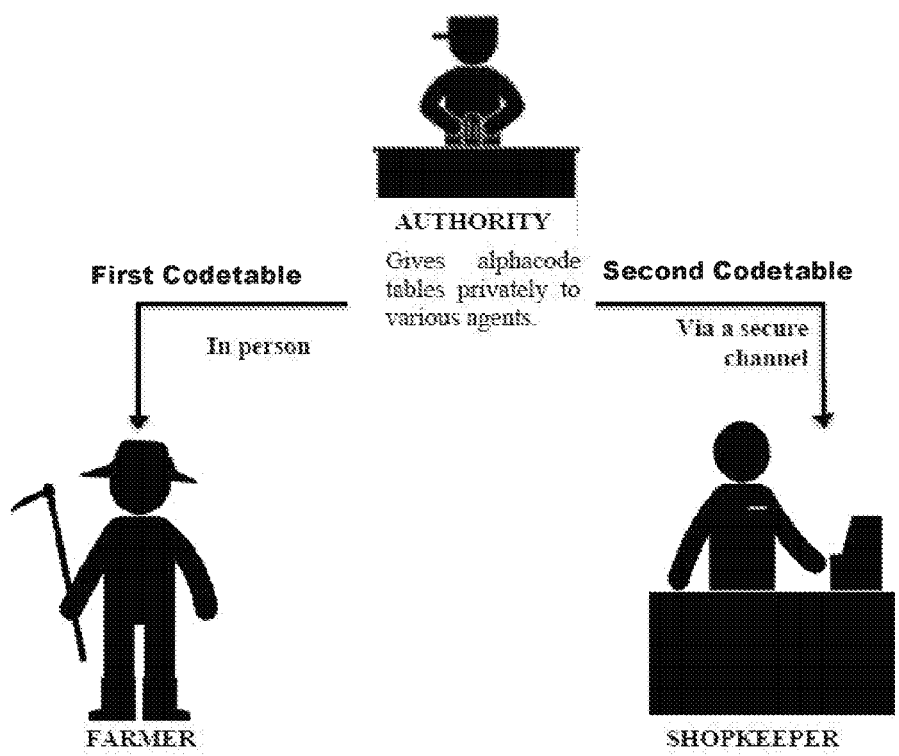
FIG. 1 is a flow diagram showing a trusted authority giving alphacode tables to various agents in an illustrative embodiment.

In a preferred embodiment, alphacodes can be tables that are shared between two or more parties to a transaction. The alphacodes will be shared between two parties who trust one another, e.g. a user and a trusted authority. Referring to FIG. 1, a flow diagram showing a trusted authority giving alphacode tables to various agents is illustrated. Each agent (e.g., a farmer, shopkeeper, bank client) will preferably receive the alphacodes over a secure channel. For example, the farmer can receive the alphacodes in person while the shopkeeper can receive the alphacodes over a secure network connection. Exemplary alphacode tables are depicted in Tables 1 and 2.

TABLE 1

| 0 | YK | NP | CK |
| 1 | CT | RK | NC |
| 2 | HY | XA | XK |
| 3 | AN | MF | YB |
| 4 | RB | PL | VL |
| 5 | OE | CA | GS |
| 6 | JM | ER | ET |
| 7 | SZ | FH | MA |
| 8 | RI | WZ | BU |
| 9 | IP | UL | DO |

TABLE 2

| 0 | DQ | MC | RF |
| 1 | VN | FC | EY |
| 2 | KJ | TQ | ML |
| 3 | AM | CH | BV |
| 4 | EC | LD | XM |
| 5 | CI | GT | ZG |
| 6 | XE | DF | PA |
| 7 | WI | ZV | OI |
| 8 | ZR | LQ | DQ |
| 9 | LF | ME | IS |

Figure 2:
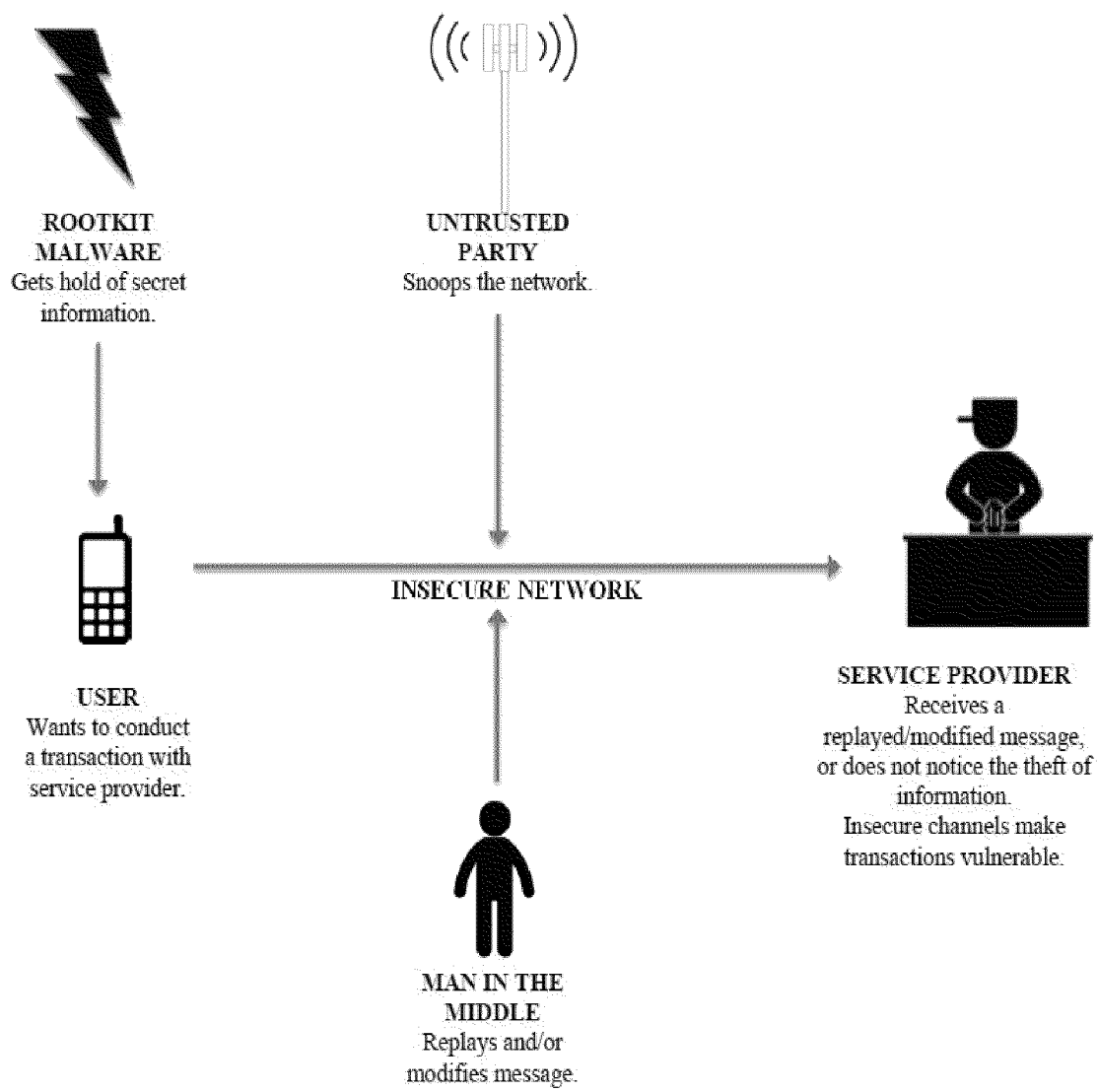
FIG. 2 is a schematic of an insecure network in an illustrative embodiment.

Referring to FIG. 2, a schematic of an insecure network is illustrated. An insecure network, such as the one depicted, leaves the user and the service provider open to several attacks. For example, a man-in-the-middle attack can be carried out wherein a malicious party can replay or modify messages sent from the user to the service provider. In another example, an untrusted party can capture communications between the user and the service provider. In a further example, a rootkit malware can be present on the user's device that can capture keystrokes, data, etc., from the user's device.

Figure 3:
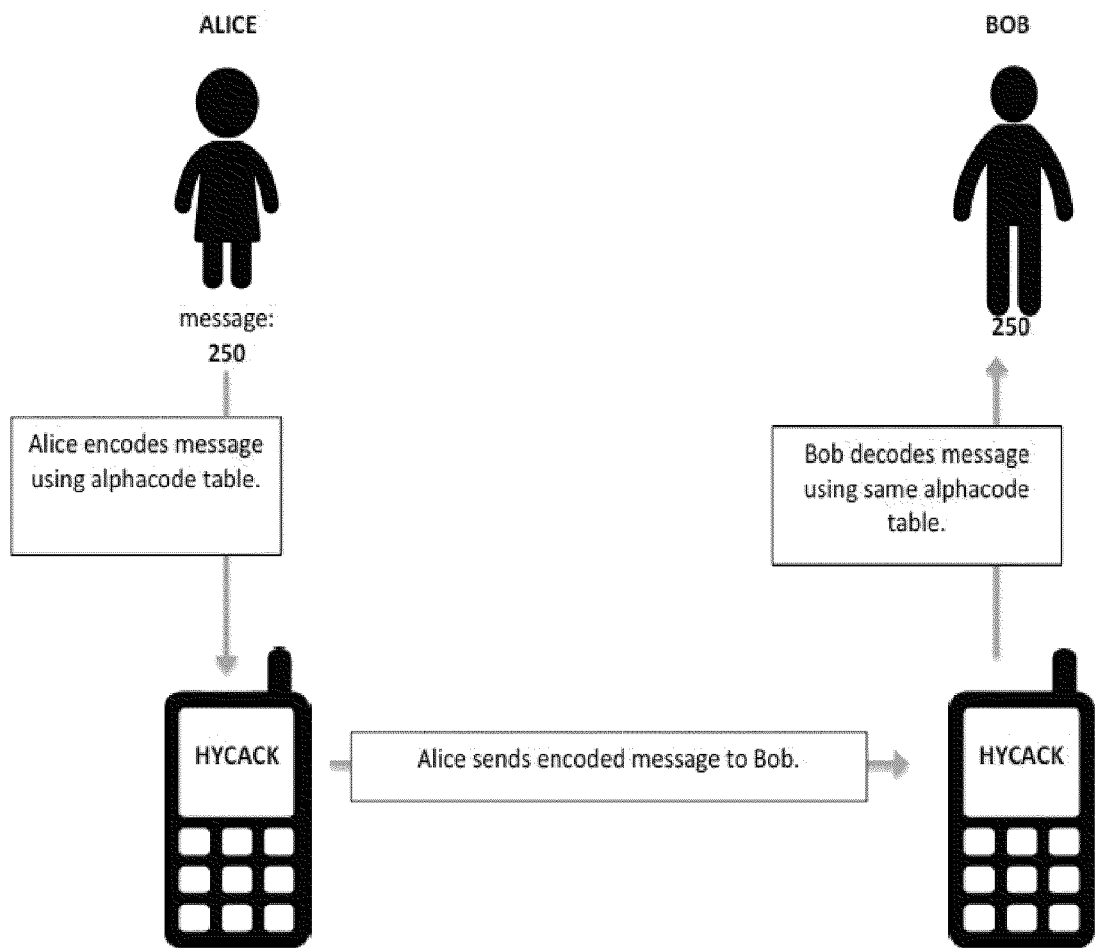
FIG. 3 is a flow diagram of an alphacode transmission using shared alphacode tables in an illustrative embodiment.

Referring to FIG. 3 a flow diagram of an alphacode transmission using shared alphacode tables in a two-party communication is illustrated. In the illustrated embodiment, Alice can have in her possession an alphacode table (e.g., Table 1) and Bob can have in his possession an alphacode table (e.g., Table 2). Alice and Bob can exchange these tables using a secure channel (e.g., in person or by secure physical courier; not shown). These tables are secret between Alice and Bob. Each party can use an alphacode table to encode a message (the encoded message). The encoded message can be sent between the parties securely. For example, let's assume Alice wants to send the number 250 to Bob. Alice can encrypt 250 using her alphacode table (e.g., Table 1).

Referring to Table 1, the numbers in the first column are the numbers that Alice chooses in order and matches with the corresponding letters in the subsequent columns. For example, 2 corresponds to codeword HY in the first codeword column, 5 corresponds to CA in the second column and 0 corresponds to CK in the third column. Therefore, encoding 250 using Table 1 can result in ciphertext HYCACK. Referring again to FIG. 3, Alice can send HYCACK across the insecure channel to Bob. Bob can decrypt HYCACK to 250 by matching the letters to numbers using the Table 1 as shared with Alice. Bob now has the information sent to him by Alice and he can be confident that it was not revealed in any way to a malicious adversary acting as the man-in-the-middle in the insecure channel. Moreover, Bob can be confident that the possessor of Table 1 sent the message, because most sequences of six letters would fail to represent three numbers. In a further example, Bob can respond to Alice to verify receipt of the message. For example, after Bob decodes the message, Bob can use Table 2 to encode the decoded message (e.g., the number 250) yielding a different ciphertext (e.g., KJGTRF). He sends the ciphertext to Alice across the insecure channel. Alice gets the ciphertext (e.g., KJGTRF) and decrypts it using Table 2. If the decrypted message is the same as the message that Alice originally encoded, then Alice can be assured that Bob obtained the correct message. Thus, Bob and Alice can be assured that the counterparty is the one who sent the message and that the message corresponds to specific content (the number 250 in the example). We call this combination of authentication and assurance of content authenticity.

In an embodiment, each alphacode table is used for one transaction only. Thus, Alice and Bob can exchange additional alphacode tables over a secure channel for subsequent transactions. In this way, each alphacode table used by Alice and Bob is a one-time substitution cipher based system. It will be appreciated by one skilled in the art that the alphacode tables can be of different sizes and dimension to accommodate different sizes of messages, encryption needs, etc.

In a further embodiment, alphacodes can be used in a manner similar to one-time message authentication codes (MACs) to authenticate messages and prove the identity of users sending and receiving the messages. For example, suppose Alice runs a service named X. In order to use the service X, Bob may need a key to login. Alice can pre-share a secret alphacode table with Bob using a secure channel. Alice can encrypt the key that Bob needs using the secret alphacode table and send the resulting ciphertext (encoded message) to Bob across an insecure channel. Bob receives the ciphertext and decrypts it using the secret alphacode table. Bob can use the decrypted key to log into the service X. If the login is successful, then Bob can be confident that Alice sent the secret table, and Alice (who monitors the service X) can be confident that it was indeed Bob who logged in.

Properties of Alphacodes

Alphacode are generated to support a number of properties including, but not limited to, supporting authentication, conveying content, ease of use, versatility, low cost, and offline support. Authentication means the ability to determine whether an asserted sender (e.g. one mentioned in plaintext) is in fact the sender. As introduced above, the term "authenticity" of a message means both authentication and that the message sent in the plaintext corresponds to the encoded message. Authenticity here corresponds to the facts that the message comes from the sender mentioned in the plaintext and the message encoded match the message in the plaintext. Some of the properties of alphacodes are discussed in greater detail below:

Support Authentication+Convey Content: Alphacodes can support authentication because accidental or deliberate tampering of information encoded using alphacodes is detectable. Alphacodes can transmit information (such as, but not limited to, numbers and other characters) in a non-forgeable manner. Because the alphacode codeword space is sparse, manufacturing codewords without the corresponding alphacode table will result in a non-message. Thus, alphacodes support authenticity, because the receiver can both verify who the sender is and whether an accompanying plaintext message is in fact encoded into a sequence of codewords encoded using an alphacode table.

Ease of Use: Alphacodes are easy to use because table lookup is a simple task. Furthermore, alphacode tables can yield ciphertext that is human readable and easily distinguishable. In another example, alphacode tables can yield ciphertext in a character set known to the users. It will be apparent to one skilled in the art that the complexity of the alphacode tables and corresponding ciphertext can be increased or decreased.

Versatility: Alphacodes can be used in various ways and configured to ensure security over insecure communication channels. For examples alphacodes can support two party protocols, three party setting (e.g., when a buyer and seller don't trust one another but deal with a trusted third party to complete the transaction), etc. In additional embodiments, alphacodes can be used via voice, text messages, emails, etc.

Low Cost: Alphacodes can be relatively inexpensive to deploy when compared to other technologies such as two factor authentication and hardware tokens.

Offline: Alphacodes can be shared over secure channels. Secure channels can include online or offline channels. For example, alphacodes can be shared as paper copies. The paper copies could be shared in person or the paper copies of the alphacodes could be mailed. The paper copies of the alphacodes can be used to, for example, log in to restricted sites such as, but not limited to, a banking portal.

In further embodiments, several variations of the above-described alphacodes can be used. For example, the input symbols can be numerals, letters, a mixture of characters from one or more languages, special symbols (e.g., # or &), etc. In another example, the codewords can consist of mixtures of letters and numbers and special symbols. Codewords can consist of "code characters" and the input symbols can include "input characters." A ciphertext can consist of a sequence of codewords.

Alphacode tables can be oriented in different ways, e.g. with the input symbols on top. The alphacode need not, in fact, be a table but merely a set of lists that associate each of a set of input symbols (an input symbol is a numerical digit in our examples so far) with a codeword. Additional or different data structures that can map an input symbol (or even several symbols) and position to a codeword can also be used. The size of an alphacode can be changed to support smaller or larger sets of input characters, and the codes can consist of one, two, or more code characters without altering the use of the alphacodes. In a further example, the size of alphacodes can be altered to increase or decrease the probability of detecting a guessed message. For example, a larger set of input characters decreases the probability of detecting a guessed message and longer entries in columns increase the probability of detecting a guessed message.

Alphacode Protocols

Alphacode protocols can be implemented to assure secure communication over insecure channels. In several of the embodiments discussed below, a trusted authority shares alphacodes with other parties over a secure channel and the other parties communicate among themselves and with the trusted authority. (See, for example, FIG. 1.) In several of the embodiments below, the parties decode ciphertexts only from the trusted authority. In other embodiments, two parties can share an alphacode (e.g., Bob and Alice, referring to FIG. 3) without the need for a third party trusted authority.

In an embodiment, a three-party alphacode-based protocol in which mutually untrusting parties interact in a secure manner based on their mutual trust of a trusted authority can be used. The three-party alphacode-based protocol can include, but is not limited to, a user, a service provider (e.g., a server), and a trusted authority. For example, the user may want to conduct a transaction with the service provider while also making sure that the user's personal or sensitive information is not revealed to the service provider. The trusted authority can check the personal details and sensitive information and either commit or abort the transaction. Alphacodes can be used to ensure that the transaction is completed and the user's sensitive information is safe from the service provider and from attacks including, but not limited to, man-in-the-middle attacks.

The two versions of the three-party alphacode-based protocol are discussed below (i.e., the minimalist and enhanced protocols). The minimalist and enhanced protocols differ in that the minimalist protocol tries to send little information in order to save work on the part of the user. The enhanced protocol can send additional information to simplify the protocol on the side of the trusted authority and to enhance clarity. In an embodiment, the enhanced protocol can include one or more nonces (a nonce can be a number, usually chosen randomly and associated with a transaction) to indicate which alphacodes a party is using. The minimalist protocol does not include nonces. The two protocols can give the same assurance of secure communication between the parties.

The minimalist and the enhanced protocol both include secure channels and insecure channels. The secure channels can be used to send messages from a source to a destination with the assurance that a third party has not snooped the message, the message is not modified, and that the message reached the destination.

In an embodiment, the user and service provider register with the trusted authority. For example, the user can send a registration request to the authority. In response, the authority can issue one or more alphacodes to the user. The service provider also sends a registration requests to the authority and receives one or more issued alphacodes from the authority. The issued alphacodes can be distributed using online or offline secure channels or a combination of online and offline secure channels. For example, the issued alphacodes can be delivered physically to the respective party. In a preferred embodiment, each issued alphacode is used for only a single transaction.

For example, for each transaction, the user can use two alphacodes issued by the authority. The two alphacodes consist of two tables UT1 and UT2. Because there can be many instances of each, a booklet might contain several alphacode tables (e.g., UT11, UT12, UT13, . . . , UTn and UT21, UT22, UT23, . . . , UT2n). In the enhanced protocol, there are two sequences of nonces as well (e.g., UY1, UY2, UY3, . . . , UYn and UZ1, UZ2, UZ3, . . . , UZn). For example, each transaction can include a nonce. The nonce can become stale after being used in a transaction.

Similarly, the service provider uses one alphacode issued by the authority. The alphacode can consist of two tables ST1 and ST2. For example, the service provide can receive ST11, ST12, ST13, . . . , STm and ST21, ST22, ST23, . . . , ST2m. In the enhanced protocol, there are two sequences of nonces as well (e.g., SY1, SY2, SY3, . . . , SYn, and SZ1, SZ2, SZ3, . . . , SZm). For example, each transaction can include a nonce. The nonce can become stale after being used in a transaction.

In addition to the alphacodes and nonces discussed above, a numerical identifier can also be assigned to the user, the service provider, or both. For example, in the minimalist protocol, a numerical identifier, $N_S$, is assigned to the service provider. In the enhanced protocol, a numerical provider is assigned to both the user and the service provider (i.e., $N_u$ and $N_s$, respectively).

In the embodiment discussed below, only the service provider communicates with the trusted authority. However, in different implementations of the protocols, the user can communicate with the trusted authority directly. In a further embodiment, the service provider can send information to the user and the user can communicate with the trusted authority. In every case, both the user and the service provider receive information from the trusted authority (whether directly or through a third party) in a form that only the trusted authority can send (i.e., the communication is authenticated). The information can, for example, relate to a transaction. For example, the information can include the amount of the transaction, and a status of the transaction (e.g., approved or rejected).

Two-Party Minimalist Protocol

Assume that user U is communicating with an authority A but the communication is happening in cleartext over an insecure channel. An adversary can launch a Man in the Middle Attack on the insecure channel and potentially modify the bits of the message. In an embodiment, a two party protocol is used such that U and A can use alphacodes to establish both identity and content over an insecure channel. For example:

| | |
|---|---|
| U : | Compute $\delta i$ = alphacode(m, UT1i) |
| U → A: | uname, m, $\delta i$ |
| A: if : | $\delta i \neq \delta'i$ |
| Compute $\alpha i$ = alphacode(00, UT2i) | |
| else if : | $\delta i = \delta'i$ |
| Compute $\alpha i$ = alphacode(m, UT2i) | |
| A → U : | $\alpha i$ |

In the above example, the user U generates a ciphertext (encoded message), $\delta i$, based on the message, m, and an alphacode table for the instant transaction, UT1i. The user sends the amount, m, the ciphertext, $\delta i$, and the user's uname, which can include, but is not limited to, an account number, a character string and the identifier i of the alphacode. The authority can receive the information over an insecure channel and compute a ciphertext, $\delta'i$, based on the message, m, and check if it matches with $\delta i$. If it matches, the authority can respond with the confirmation response using the response alphacode computed using message m and the response table UT2i. If the code does not match, the authority can respond with the code corresponding to a NULL message as a response.

Minimalist Protocol

Figure 4:
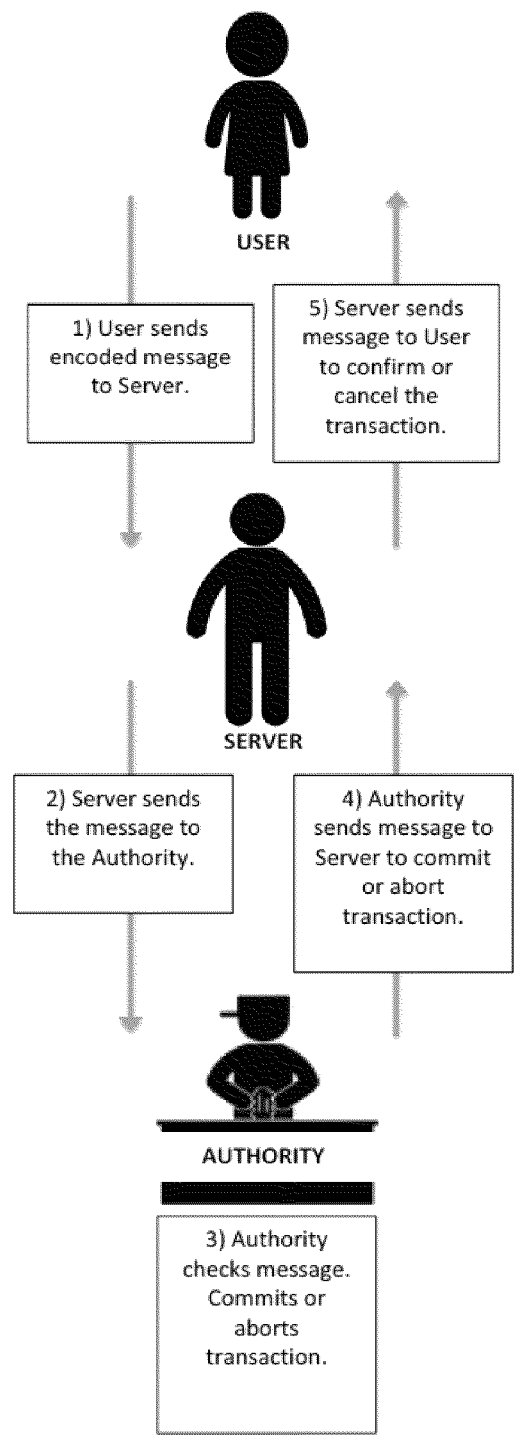
FIG. 4 is a flow diagram of a three-party alphacode transmission protocol in an illustrative embodiment.

Referring to FIG. 4, a flow diagram of a three-party alphacode transmission protocol is illustrated. A user provides the server with enough information in the clear for the server to understand how much is being sent, from whom, to whom, etc. Additional, different, or less information can be provided both in the clear and in encoded form. For example, the information can additionally include an item being purchased, information about the item, or both. In another example, less information can be sent. For example, if the server independently knows the amount, then that amount need not be sent. The server can send the information received from the user and the amount to the trusted authority from whom the payment is coming. One example of information encoding and transmission between the user (U), the server (S), and the authority (A) is listed below:

| | |
|---|---|
| U : | Compute $\delta i$ = alphacode(Am, $N_S$ , UT1i) |
| U → S : | uname, Am, $\delta i$ |
| S : | Compute $\gamma j$ = alphacode(Am, ST1j) |
| S → A : | uname, Am, $\delta i$, sname, $SYj$ , $\gamma j$ |

In the above example, the user generates a ciphertext, $\delta i$, based on the amount, Am, the server's numeric identifier, $N_s$, and an alphacode table for the instant transaction, UT1i. The user sends the amount, Am, the ciphertext, $\delta i$, and the user's uname, which can be, but is not limited to, an account number, a character string, or some mixture of the two. The server can receive the information and compute a ciphertext, $\gamma j$, based on the amount, Am, and the server's alphacode table for the instant transaction, ST1j. The server then sends a subset of the information to the authority. For example, the server can send the uname, the amount, Am, the user's ciphertext, $\delta i$, the server's sname, a nonce, SYj, and the ciphertext generated by the server, $\gamma j$.

The ciphertexts discussed above are generated based on the amount, Am and an alphacode table (e.g., the user references alphacode table UT1i). For example, when the user computes cyphercode $\delta i$, the user performs an alphacode operation in which each position in Am is converted to ciphertext using the selected alphacode table. For example, If the $p^{th}$ position of Am is a, then the $p^{th}$ position of $\delta i$ is the string in the $(p+1)^{th}$ column and the $(a+1)^{th}$ row of UT1i. For example, if Am=21, $N_s$=47, and UT1i is the flowing table:

| 0 | KL | WR | IU | AK | DO | HG | SP | GZ | WM |
|---|----|----|----|----|----|----|----|----|----|
| 1 | HW | TU | BQ | GN | QL | JD | QB | LZ | UU |
| 2 | YT | IP | NZ | LW | ND | EL | HD | JI | GX |
| 3 | AD | HV | EI | YU | XO | QM | FJ | HR | GD |
| 4 | WO | CK | DO | ER | AP | IL | PR | RH | HK |
| 5 | RN | BA | LF | WV | EM | OX | KS | LT | KM |
| 6 | JL | KQ | HB | PI | GI | PZ | CT | OY | TL |
| 7 | GD | GP | UA | NQ | ZJ | NA | OP | MT | KY |
| 8 | QE | SX | LX | CI | DP | FI | UE | YW | PO |
| 9 | RY | RH | FP | SL | JA | OC | RV | LG | NV |

Then, $\delta i$=YTTUDONQ. The string in the second row (corresponding to number 2) in the first codeword column is YT and in the first row (corresponding to the number 1) of the second codeword column is TU. Similarly, we get the numerical identifier of the server of DO (corresponding to 4 in the third column) and NQ (corresponding to 7 in the fourth column). It will be appreciated by one skilled in the art that a narrower alphacode table can be used if the size of the information is smaller than the number of columns in the table. In another example, the numbers could be filled in with leading zeroes. For example, 21 could be thought of as 0000021 having the ciphertext (including the alphacoding of $N_S$) of: KLWRIUAKDOELQBRHKY.

As discussed above, the server sends a subset of the information from the server. The authority can determine which alphacode tables were used for ciphertexts $\delta i$ and $\gamma j$, decode the ciphertexts, and compare the decoded information. The authority can send a confirmation based on the comparison back to the server and the user.

In an embodiment, the authority can perform the following steps:

```
A :    Compute δ'i = alphacode(Am, N_s, UT1i)
A :    Compute γ'j = alphacode(Am, ST1j )
  if : δi ≠ δ'i or γj ≠ γ'j
A :    Compute αi = alphacode(00, UT2i)
A :    Compute βj = alphacode(00, ST2j )
  if : δi = δ'i and γj = γ'j
A :    Compute αi = alphacode(Am, UT2i)
A :    Compute βj = alphacode(Am, ST2j )
A → S :    αi, βj
S → U :    αi
```

The authority retrieves the UT1i for the instant transaction based on the received uname. For the minimalist version, the authority can keep track of which transactions have already been conducted with the user. The authority can use the transaction information to select which table UT1i to user. Each table can be used for, at most, one transaction. If a second transaction uses the same table and a different amount, the authority can determine that the request is fraudulent. The selection of the table does not necessarily have to be linear. For example, if the authority has already processed transaction i−1 from the user, then the authority can look for table j, where j≥i. In embodiment where the enhanced protocol is used, the authority can use the table corresponding to the nonce that the user sends to the server and that the server relays to the authority. The authority can also check that the encoded $N_S$ corresponds to the sname sent from the sender who purports to be the server. Without this additional check, the user might think it is paying the server, but a different server, S', could take the money.

In the above examples, $N_S$ is a two digit number. It will be appreciated that $N_s$ can include several more digits. In another embodiment, the user registers with a limited number of possible servers with the authority and the same $N_s$ can indicate a different servers for different users. For example, $N_s$ 47 for a first user might mean a different server from 47 for a second user.

Referring again to FIG. 4, the authority computes $\delta'i$ using Am, $N_S$, and UT1i. Similarly, the authority computes $\gamma'j$ using Am, ST1j. The ST1j can be selected based on, for example, the sname. The authority then compares $\delta'i$ and $\gamma'j$ to the received cypertexts $\delta i$ and $\gamma j$, respectively. If $\delta i \neq \delta'i$ or if $\gamma j \neq \gamma'j$ or if the server name does not correspond to $N_S$ encoded in $\delta i$, then the authority computes $\alpha i$=alphacode (00, UT2i) and, $\beta j$=alphacode(00, ST2j). In each case, the two zeroes would be transformed into four letters using the corresponding alphacode table. Also, in each case, the authority can consider the transaction to be aborted. It will be appreciated that more or fewer zeroes or a different pre-determined message can be encoded using the alphacode computation. It will also be appreciated that a lengthier code can make it more difficult for an adversary to guess an encoded message. In a further embodiment, the authority can determine if either alphacode table has been previously used and, as a result, abort the transaction.

In another example, the authority can determine that $\delta i = \delta'i$ and $\gamma j = \gamma'j$ (and neither ciphertext has been used for another transaction). The authority can compute $\alpha i$ using Am and UT2i. The authority can also compute $\beta j$ using Am and ST2j. If these are equal, then the authority can conclude that the identities of the senders of these messages are indeed U and S (the asserted parties are thereby authenticated) and that the amount is indeed Am. Thus the authority has determined authenticity of the two messages (e.g., both authentication and that they express the same amount). The authority can send the computed $\alpha i$ and $\beta j$ to the server. The server sends $\alpha i$ to the user. The authority commits or aborts the transaction before sending the encoded confirmation to the user and the server. Committing can include the trusted authority declaring the instant transaction to be complete and, for example, permitting a money transfer from the user to the server based on the transaction.

Referring to FIG. 4, the authority tests that the user and the server sent the same message and if so, confirms the transaction. Otherwise the authority can abort the transaction. The authority can determine that the user and the server are sending consistent messages by, for example, determining that the messages are consistent based on the received ciphertexts. The protocol can define consistency in several ways including, but not limited to, equality between the messages (e.g., the messages are identical), one message contains a substring of the other, the strings of the two messages are similar in some other application-significant way. In addition the authority can further determine consistency by determining that $N_S$ in the ciphertext sent by the user corresponds to sname sent by the server.

Figure 5:
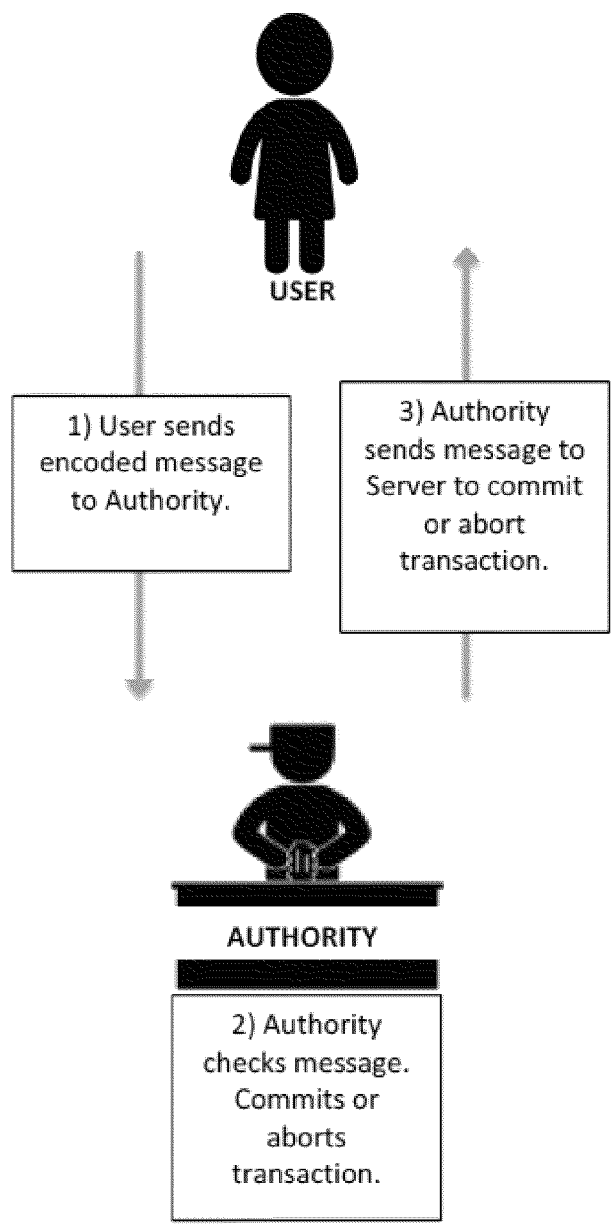
FIG. 5 is flow diagram of a communication between a user and an authority in an illustrative embodiment.

The user and the server can determine if the transaction was committed or aborted based on ciphertext received by each (i.e., $\alpha i$ and $\beta j$, respectively). In an embodiment, the server can compute $\beta'j$ using Am and alphacode table ST2j. If $\beta j \neq \beta'j$, then the server can determine that the transaction was canceled. If, however, $\beta j = \beta'j$, then the server can determine that the transaction was committed. In this case, the server can conclude both that the authority sent the message (e.g., authentication) and the amount. This is again an example of the establishment of authenticity. In a further embodiment, the server can determine that the response is not well-formed (i.e., the ciphertext does not correspond to any possible sequence of codewords), and can request a retransmission of the message. If the response is well-formed then the response should either correspond to the amount originally sent or should be all zeroes. If the response is all zeroes, then the receiving party should note that the transaction has been aborted. If anything else, then the server can ask for a retransmission. Referring to FIG. 5, the user can also determine the status of the transaction, request a retransmission, or both, in a similar manner. The algorithm below illustrates determining the status of the transaction by the server and the user based on the response received from the authority:

```
S :   Compute β'j = alphacode(Am, ST2j )
U :   Compute α'i = alphacode(Am, UT2i)
      if (for U) : αi ≠ α'i
          Transaction has been aborted by A
      if (for S) : βj ≠ β'j
          Transaction has been aborted by A
      if (at U) : αi = α'i
          U knows that transaction has been committed by A
      if (at S) : βj = β'j
          S knows that transaction has been committed by A
```

The server can compare $\beta j$ to $\beta' j$ to determine if the transaction has been committed or aborted. Similarly, the user can compare $\alpha i$ to $\alpha' i$ to determine if the transaction has been committed or aborted. Because $\alpha i$ and $\beta j$ were computed using alphacodes only shared with the user and the authority, respectively, each party can be assured that the status of the transaction was not modified and was sent from the authority.

Enhanced Protocol

In an embodiment, an enhanced protocol can be implemented for alphacode-based transactions. In the enhanced protocol, additional information, such as the user's personal-identification number, $N_u$, and a nonce, $UY_i$, can be included in messages sent between the user, server, and authority. The additional information can indicate, for example, that the current transaction is the $i^{th}$ transaction between the user and the trusted authority. Further, the enhanced protocol can add an acknowledgment step that can permits the trusted authority to "forget" certain transactions. For example, the acknowledgement step can include, but is not limited to, the following steps:

```
U :    Compute δi = alphacode(Am, N_U , UYi, N_S , UT1i)
U → S :  uname, Am, UYi, δi
S :    Compute γj = alphacode(Am, N_S, SYj , ST1j )
S → A :  uname, Am, UYi, δi, sname, SYj , γj
```

In the above example, the user can provide the server with information in the clear for the server to understand how much is being sent, for whom, and to whom. As discussed above, other information can be provided both in the clear and in alphacode-based encoded form. That other information can include, but is not limited to, the item being purchased, information about the item, or both. In this way the server can confirm to the trusted authority from whom the payment is coming and also confirm the amount. In a further embodiment, if either the user or the server has a trusted channel with which to communicate with the authority, the respective party can avoid the encoding and send the message to the authority directly.

In an embodiment, the user can encode the message to the authority using an alphacode table. The message can be based on, for example, the amount Am, the sensitive number $N_U$, the nonce UYi, the server identifier $N_S$, and the alphacode-table UT1i. The user can generate ciphertext $\delta i$ by encoding the message using the alphacode table UT1i. For example, if the $p^{th}$ position of Am is a, then the $p^{th}$ position of $\delta i$ is the string in $(p+1)^{th}$ column and $(a+1)^{th}$ row of UT1i. For example, $\delta i$ is computed as follows: let Am=21, $N_u$=539, UYi=46, $N_s$=47, and let UT1i be:

| 0 | KL | WR | IU | AK | DO | HG | SP | GZ | WM |
| 1 | HW | TU | BQ | GN | QL | JD | QB | LZ | UU |
| 2 | YT | IP | NZ | LW | ND | EL | HD | JI | GX |
| 3 | AD | HV | EI | YU | XO | QM | FJ | HR | GD |
| 4 | WO | CK | DO | ER | AP | IL | PR | RH | HK |
| 5 | RN | BA | LF | WV | EM | OX | KS | LT | KM |
| 6 | JL | KQ | HB | PI | GI | PZ | CT | OY | TL |
| 7 | GD | GP | UA | NQ | ZJ | NA | OP | MT | KY |
| 8 | QE | SX | LX | CI | DP | FI | UE | YW | PO |
| 9 | RY | RH | FP | SL | JA | OC | RV | LG | NV |

Then $\delta i$=YTTULFYUJAILCTRHKY. The ciphertext can be encoded as described above. For example, the string in the second row of the first column is YT, the string in the first row of the second column is TU, the string in the fifth row of the third column is LF, the string in the third row of the fourth column is YU, the ninth row of the fifth column is JA, the fourth row of the sixth column is IL, the sixth row of the seventh column is CT, the fourth row of the eighth column is RH, and the seventh row of the seventh column is KY. The user can send uname (e.g., a name of the user), Am, UYi and the encoded message $\delta i$ to the server. The server can compute $\gamma j$ using Am, $N_S$, SYj, and ST1j by performing an alphacode operation. The server can send uname, Am, UYi, $\delta i$, sname (e.g., name of the service), SYj, and $\gamma j$ to the authority. The authority can verify the transaction. For example, the authority can carry out the steps below to verify the transaction:

```
A :    Compute δ'i = alphacode(Am, N_U, UYi, N_S, UT1i)
A :    Compute γ'j = alphacode(Am, N_S, SYj, ST1j)
if :   δi ≠ δ'i or γj ≠ γ'j
       A:  Compute αi = alphacode(00, UT2i)
       A:  Compute βj = alphacode(00, ST2j )
if :   δi = δ'i and γj = γ'j
       A :  Compute αi = alphacode(Am, N_U, UYi, UT2i)
       A :  Compute βj = alphacode(Am, N_S, SYj, ST2j)
A → S :  αi, βj
S → U :  αi
```

The authority can receive the uname and get a corresponding $N_u$ based on the uname. The authority can receive UYi and can infer a corresponding UT1i. In a further embodiment, there can be several $N_U$ s for a given user. The authority can try several of $N_u$'s to see which corresponds to the received UYi. The authority can compute $\delta' i$ using Am, $N_U$, UYi, $N_S$, and UT1i. Similarly, the authority can receive sname and retrieve the corresponding $N_S$. The authority can also receive SY1j and retrieve the corresponding ST1j. The authority can compute $\gamma' j$ using Am, $N_S$, SYj, and ST1j.

After computing $\delta' i$ and $\delta' j$, the authority can compare the computed ciphertexts with the received cypher texts and determine if the corresponding transaction should be committed or aborted. For example, if $\delta i \neq \delta' i$ or if $\gamma j \neq \gamma' j$ or if sname does not correspond to $N_S$, then the authority can determine that the transaction should be aborted. The authority can send a notice of the canceled transaction to the parties. For example, the authority can compute $\alpha i$=alphacode(00, UT2i) and, $\beta j$=alphacode(00, ST2j). This means while computing $\alpha i$ the message would be two zeroes instead of Am, $N_U$, and UYi. Similarly, for $\beta j$ the first parameter would be two zeroes instead of Am, NS, and SYi. As with the minimalist protocol, the alphacode computation outputs four letters corresponding to the two zeroes. It will be appreciated that, although the example above uses two zeroes, the authority could as easily use a different sequence of numbers, characters, etc.

In another example, the authority can determine that $\delta i$=$\delta' i$ and $\gamma j$=$\gamma' j$ and that sname corresponds to $N_s$. As for the minimalist protocol, if these are equal, then the authority can conclude that the identities of the senders of these messages are indeed U and S (e.g., the asserted parties are thereby authenticated) and that the amount is indeed Am. Also, as for the minimalist protocol, the authority has determined authenticity of the two messages and that they express the same amount. Thus the authority can consider the transaction to be committed and send a confirmation to the parties. For example, the authority can compute αi using Am, $N_U$, UYi, and UT2i and computes, βj using Am, $N_S$, SY1j, and ST2j. The authority can send αi and βj to the server and the server can send αi to the user.

The parties can receive their respective confirmation ciphertexts from the authority (e.g., αi an βj for the user and the server, respectively). Each party can generate a ciphertext and compare the generated ciphertext to the received confirmation ciphertext. For example, the user and the server can carry out the following steps:

```
S :  Compute β'j = alphacode(Am, N_S, SYj, ST2j)
U :  Compute α'i = alphacode(Am, N_U, UYi, N_S, UT2i)
  if (at U) :  αi ≠ α'i
U :   U will abort the transaction
  if (at S) :  βj ≠ β'j
     S :    S will abort the transaction
  if (at U) :  αi = α'i
     U → S :    UZi
  if (at S) :  βj = β'j
     S → A :    UZi, SZj
```

The server can compute β'i using Am, $N_S$, SYj, and ST2j. The user can compute α'i using Am, $N_U$, UYj and UT2i. If αi≠α'i, the user can abort the transaction. If, βj≠β'j, the server can abort the transaction. As in the minimalist protocol both the user and the server can be assured that the received message came from the authority when the messages are properly encoded using alphacodes known only to the authority and the intended recipient of the message. If both Ei=α'i and βj=β'j, then both the user and server conclude that the authority has committed the transaction. The user can send a nonce, UZi, to the server and the server can send the received nonce as well as an additional nonce, SZj, to the authority to confirm the end of transaction. In a further example, the user can wish to abort the transaction and the server can wish commit the transaction. The authority can act as a final arbiter when the user and the server disagree as to the status of the transaction.

Minimal and Enhanced Protocols Over a Noisy Channel

The above described alphacode protocols can be implemented over noisy channels. Noisy channels can cause message losses in the communication channel (including message drops by a man-in-the-middle adversary). Thus, an ability to resend messages is needed. In one embodiment, the authority can keep track of transactions that have been executed and never execute the same transaction (e. g, in response to the same messages from the user and the server) more than once. This can be implemented, for example, by saving the relationships between messages received with transactions performed and looking up messages received against the stored relationship to determine if a transaction corresponding to the received messages already exists.

Security Analysis

The security analysis discussed below applies to both the minimalist and the enhanced versions of the protocol. In some embodiment, the enhanced protocol can generate longer ciphertexts than the minimal protocol. Thus, the enhanced protocol can have a smaller probability of forgery than the minimal protocol.

Step 1

In an embodiment, the user can compute δi from UT1i, amount Am, server identifier $N_S$, and, in the enhanced protocol, the sensitive number $N_U$ and session nonce UYi. $N_U$ can be any sensitive information such as a credit card number, bank account number, identity information etc. Since the user does not want to reveal $N_U$, it is encoded using an alphacode table. The probability of guessing each codeword of table UT1i can be 26-l, where l is the size of the message. In the preferred embodiment, each letter in UT1i can range from A to Z. Each letter can be sampled uniformly at random, therefore the entries can be independent of one another (except that no two entries in the same column may be entirely equal). Hence, the probability to guess an entry of UT1i can be approximately 26-l. A would-be forger has a negligible probability of forging the message to achieve a recognizable ciphertext. In a further embodiment, the probability of forgery can be further reduced by beginning all amounts with leading zeroes. Similarly the probability of guessing each entry of tables UT1i, UT2i, ST1j, ST2j is 26-l. The server can compute γj from Am, and, in the enhanced protocol, $N_S$ (sensitive number of the service) and ST1j. The server sends uname, Am, δi, sname, and γj to the authority for verification.

Step 2

In an embodiment, the authority can use uname and sname among other information to compute δ'i and γ'i. Session nonces UYi and SYj can be used in the enhanced protocol to help the authority identify the corresponding tables (e.g., UT1i and ST1j) for the current session. In another example, one or both of the session nonces can be exclude.

If δi≠δ'i or if γj≠γ'j or sname does not correspond to $N_S$ as stored in δi, then the authority knows that δi or γj have been tampered with or someone is trying to impersonate the server. In this case, the authority can compute αi and βj using zeroes as the parameter in operation alphacode and the authority can abort the transaction. If the authority sent an "Abort" or any other message in cleartext, the adversary could change it and continue the transaction. In the present embodiment, however, the authority can send zeroes encoded in both αi and βj to the server. Because an adversary would have knowledge of at most one of alphacode tables UT2i and ST2j, the adversary would have a low probability of decoding or forging either αi, βj, or both.

In an embodiment, the authority can determine that δi=δ'i and γj=γ'j and sname corresponds to $N_S$. The authority can be confident the message has been sent by the server and the user and that the server and the user agree on the amount and on the identity of the user's intended counterparty (i.e., the server). The authority can commit the message and compute response messages for the server and the user. For example, the authority can compute αi using alphacode table UT2i and βj using alphacode table ST2j. The authority can send αi and βj to the server and the server can send αi to the user. Each party can confirm the status of the transaction. Thus, the authority can firm a confirmation to the server and user that it is the authority who received the message and that the amount is consistent.

Step 3

In an embodiment, the server can compute β'j using ST2j and the user can compute αi using UT2i. The server and the user can check the authenticity of βj and αi respectively and determine if the transaction was committed or aborted. For example, if αi≠α'i but α'i uses possible code words from the alphacode table, then the user can determine that that the transaction has been aborted. Because the status was encoded using an alphacode known only to the user and the authority, the user can be confident that the authority sent the message. If α'i is not composed of possible codewords, then the user can ask for the message again. In a further example, if after several retries, the user continues to see this inequality, then the user waits more or can go out-of-band (e.g. physically visit the authority or use some other modality of communication that the user finds more trustworthy) to find the status of the transaction. The server can similarly determine the status of the transaction.

In another example, if αi=α'i then the user can be confident that αi is authentic and it was sent by the authority and that the user and the server agreed on the amount and that the authority is aware of this amount. If βj=β'j then the server can be confident that βj is authentic and it was sent by the authority. The matching ciphertexts can also means that the authority has certified that the amount it received agrees with the amount that the user and the server agreed to and that the user and the server sent the same amount. In the enhanced protocol, the server and the user can send a confirmation nonce UZi and SZj to the authority. The authority can check if UZi and SZj are genuine. If they are, the authority can forget the transaction. In another embodiment, the authority can retain a copy of the forgotten transaction for other purposes, such as, but not limited to, tax purposes or auditing purposes.

EXAMPLES

The alphacode protocols can be applied in many scenarios. For the most part either the minimalist or the enhanced protocol can be used. When there are differences in their application, we cite those differences here. Although the using the following scenarios.

E-commerce transactions: For e-commerce, a purchaser can play the role of the user in the protocols of the previous section, the vendor can play the role of the server, and the bank or credit card provider plays the role of the authority. The registration and the steps of the protocols can be the same as the alphacode protocols in the section above Voice based transactions and phone banking: Alphacode based transactions can include phone based transaction. Phone based transactions can range from customer service issues to phone based banking services. Phone lines constitute an insecure channel. In a phone based transaction scenario, the customer service representative plays the role of the service provider (i.e., the server), the customer plays the role of the user, and the bank back end plays the role of the trusted authority. Given these roles, the protocols are the same as described above. The medium of data interchange can be voice.

Mobile banking: Another direct application is mobile banking where, for example, users can leverage their phones to perform banking transactions such as, but not limited to, money transfer and payments. In an embodiment, a bank can share alphacodes with an end-user through a trusted channel such as a physical channel or signed email. Using the alphacode, the user can follow the protocols discussed above to perform a transaction over a mobile channel such as, but not limited to, SMS. Given that the individual codes are short, each step of the protocols can be encoded in a 140-byte SMS message. This encoding can be similar to how users currently add credit to their mobile device in usage based pricing plans.

Rural banking: Several rural banking or branchless banking scenarios can make use of alphacode protocols discussed above.

In an embodiment, the bank can assign a shopkeeper in the village to be the middleman or agent who can act as a gateway for providing financial transactions. Cellphones can be used as the medium of transaction. These can be used for recording transactions and communicating with a bank. A farmer can go to the bank at least once to establish a bank account and obtain alphacodes. As long as the farmer has unused alphacodes, deposits and withdrawals can be done remotely with the help of the shopkeeper and cellphone. The farmer can go to the shopkeeper, if he or she has to deposit or withdraw any amount to or from his bank account. Other services such as remote payments and money transfers can be built on these primitives.

In an embodiment, the alphacode protocols can be applied in rural banking. For example, the shopkeeper can play the role of the service provider, the farmer can play the role of the user, and the bank can play the role of the trusted authority. The protocols can be the same as described above. The transactions can include both deposits and withdrawals. In an embodiment, the type of transaction can be represented by a transaction type identifier including, for example, 00 for deposits and withdrawal by 11. This assignment for deposit and withdrawal can be known to the farmer and the shopkeeper. As part of the amount Am, the first two numbers can be the transaction type identifier be either 00 or 11 depending on whether the farmer wants to deposit or withdraw money. For example, if the farmer wants to deposit 20, then Am can be 0020. Similarly if the farmer wants to withdraw 20, then Am can be 1120. The bank can use the encoding of the first two numbers in Am to determine whether the transaction is a deposit or withdrawal.

Figure 6:
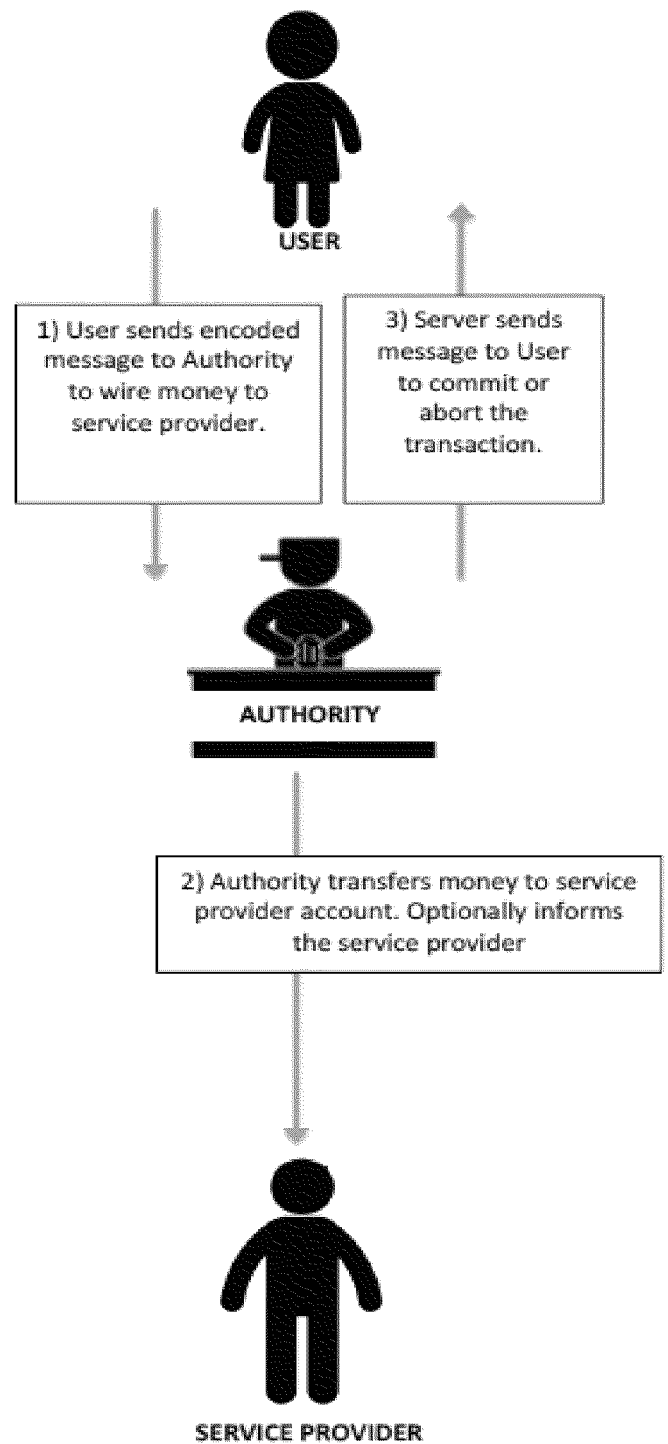
FIG. 6 is a flow diagram of a money-transfer transaction between the user and the authority in an illustrative embodiment.

Money transfer through a trusted intermediary: The alphacode protocols can also be used for person-to-person money transfer. Referring to FIG. 6, a money transfer protocol is illustrated. In this scenario, the money transfer service provider can be the same as the trusted authority. The sender can play the role of the user. An exemplary money transfer protocol is discuss below.

In an embodiment, the sender can use the receiver's number $N_R$ in the computation of $\delta i$. $N_R$ might be the receiver's phone number or bank account number or an identity number that is given by the service provider or trusted authority. The sender can send uname, Am, and $\delta i$ to the service provider.

```
U :    Compute δi = alphacode(Am, NR , UT1i)
U → S/A :    uname, Am, δi
```

The bank/service provider/trusted authority can use the uname and previous interactions with the user to find the user's alphacode table. The bank can computes $\delta'i$ using Am and UT1i. If $\delta'i$ contains a prefix (the first part) of $\delta i$, then the authority reads the rest of $\delta i$ to determine the recipient. In another embodiment, the user can send the name or account number of the recipient in cleartext and the bank can check that the recipient's identifier in the alphacode is what is expected based on, for example, the recipient name. If the bank determines that the instructions are in good order, the bank can commit the transaction (e.g., the money transfer request) and returns a confirmation in the form of ciphertext αi constructed from, for example, Am, $N_R$, and UT2i.

```
A : Compute δ'i = alphacode(Am, UT1i)
if : δ'i is not a prefix of δi or the identification number that follows does
not correspond to a known recipient then
      A:     Compute αi = alphacode(00, UT2i)
if : δi is a prefix of δ'I and the identification number that follows does
correspond to a known recipient then
      A:     Compute αi = alphacode(Am, N_R , UT2i)
      A/S → U:  αi
```

In an embodiment, the can user receive ciphertext αi from the bank either denying the transaction (indicated by, for example, 00) or confirming it. For example, one form of confirmation is illustrated below. Additional or different confirmations can be used including, but not limited to, a shorter confirmation (e.g. 11) or a confirmation that includes additional information (e.g. the date).

```
U : Compute αi = alphacode(Am, NR , UT2i)
if : αi ≠ α'i
The trusted authority rejected the transaction
if : αi = α'i
The trusted authority committed the transaction
```

In a further embodiment, receiver information can be included in both the cleartext and in the ciphertext so the bank can be confident that money was directed to the correct recipient. In another embodiment, additional levels of confirmation can be included.

Money transfer through an untrusted intermediary: The alphacode protocols can be used for person-to-person money transfer when the bank differs from the trusted authority. In an embodiment, the money transfer service provider can play the role of the service provider (e.g., server), the sender plays the role of the user and the bank plays the role of the trusted authority. The server is not the recipient of the money, therefore both the server and the authority are told who the receiver is. A modified minimal protocol to support money transfers through an untrusted intermediary is disclosed below. The enhanced protocol can be similarly modified.

In an embodiment, the sender can use the receiver's number $N_R$ in the computation of δi. $N_R$ can be, but is not limited to, the receiver's phone number, bank account number, an identity number, etc. that is given by the service provider. If $N_R$ is a sensitive number then it is encoded in δi and not sent in plaintext. The user can send uname, Am, rname (e.g., a username of the receiver; this is optional but can be checked against $N_R$ to ensure consistency) and δi to the service provider. rname and $N_R$ are highlighted to indicate the changes in the protocol from the minimalist alphacode protocol.

```
U : Compute δi = alphacode(Am, NR , UT1i)
U → S :   uname, Am, rname, δi
S : Compute γj = alphacode(Am, ST1j )
S → A :    uname, Am, rname, δi, sname, γj
```

In an embodiment, the bank can use rname to find the receiver's sensitive information $N_R$. The bank can compute δ'i using Am, $N_R$, and UT1i. If δ'i=δi, the bank can compute αi using Am, $N_R$, and UT2i and the authority can commit the transaction.

```
A : Compute δ'i = alphacode(Am, NR , UT1i)
A : Compute γ'j = alphacode(Am, ST1j )
if : δi ≠ δ'i or γj ≠ γ'j
A : Compute αi = alphacode(00, UT2i)
A : Compute βj = alphacode(00, ST2j )
if : δi = δ'i and γj = γ'j [e.g., authenticity step]
A: Compute αi = alphacode(Am, NR , UT2i)
A: Compute βj = alphacode(Am, ST2j )
A → S :    αi, βj
S → U :    αi
```

Figure 7:
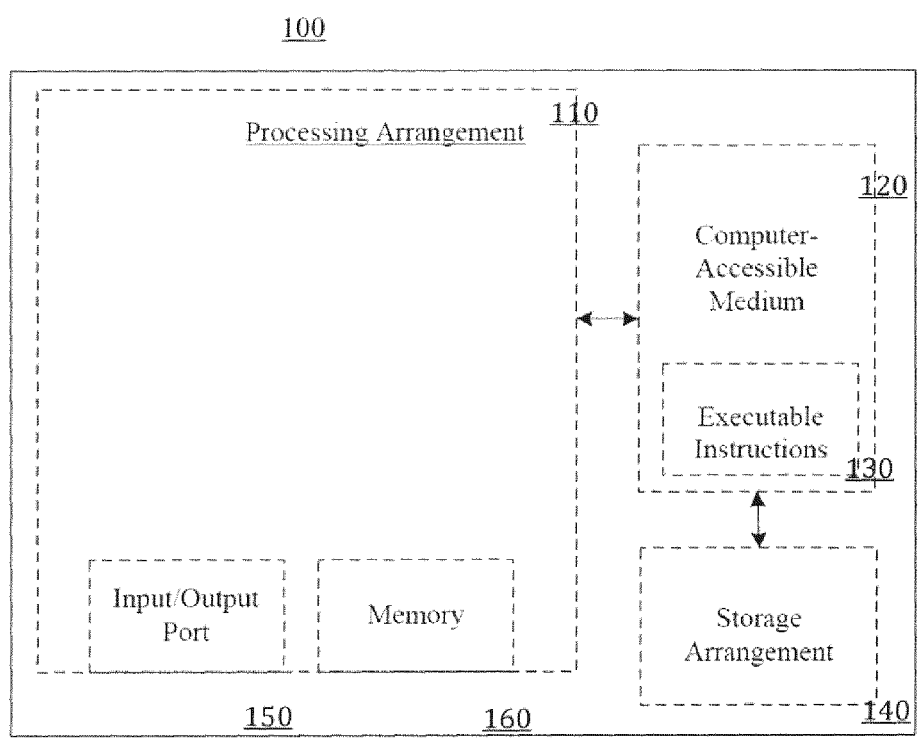
FIG. 7 illustrates a computer system for use with certain embodiments.

One implementation may utilize a computer system, such as shown in FIG. 7, e.g., a computer-accessible medium 120 (e.g., as described herein, a storage device such as a hard disk, floppy disk, memory stick, CD-ROM, RAM, ROM, etc., or a collection thereof) can be provided (e.g., in communication with the processing arrangement 110). The computer-accessible medium 120 may be a non-transitory computer-accessible medium. The computer-accessible medium 120 can contain executable instructions 130 thereon. In addition or alternatively, a storage arrangement 140 can be provided separately from the computer-accessible medium 120, which can provide the instructions to the processing arrangement 110 so as to configure the processing arrangement to execute certain exemplary procedures, processes and methods, as described herein, for example.

System 100 may also include a display or output device, an input device such as a keyboard, mouse, touch screen or other input device, and may be connected to additional systems via a logical network. Many of the embodiments described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, hand-held devices, multi-processor systems, microprocessor-based or programmable consumer electronics, network PCs, minicomputers, mainframe computers, field programmable gate arrays (FPGA), and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method for conducting a transaction comprising:
sending a first codetable to a first participant;
sending a second codetable to a second participant;
receiving a first encoded message, a second encoded message, and a plaintext message, wherein the first encoded message is based on the first codetable and the second encoded message is based on the second codetable and wherein the plaintext message includes an amount, a user identifier, an identifier of the first codetable, a first nonce corresponding to the first codetable, and a second nonce corresponding to the second codetable;
generating a first ciphertext based at least on the first codetable and the plaintext message;
comparing the first ciphertext to the first encoded message;
determining an authenticity of the first encoded message based at least on the comparing to the first ciphertext;
generating a second ciphertext based at least on the second codetable and the plaintext message;
comparing the second ciphertext to the second encoded message;
determining an authenticity of the second encoded message based at least on the comparing to the second ciphertext;
sending a first confirmation to the first participant based on the authenticity of the first encoded message and the second encoded message and based on a determination that the first and second messages encode the same information; and
sending a second confirmation to the second participant based on the authenticity of the first encoded message and the second encoded message and based on the determination that the first and second messages encode the same information.

2. The method of claim 1, wherein the first confirmation comprises an encoded confirmation.

3. The method of claim 2, wherein the encoded confirmation is at least partly based on the received plaintext message when the first and second encoded messages are determined to be authentic.

4. The method of claim 2, wherein the encoded confirmation is based on a predetermined message when the first or second encoded messages are determined to be inauthentic.

5. The method of claim 1, wherein each codetable is used for only one transaction.

6. The method of claim 1, wherein the first and second confirmations are sent to the first participant, and wherein the first participant sends the second confirmation to the second participant.

7. The method of claim 1, wherein the first codetable is sent over a first secure channel and the second codetable is sent over a second secure channel which may differ from the first.

8. The method of claim 1, wherein the first ciphertext message includes an indicator of an amount.

9. The method of claim 8, wherein the first ciphertext message includes an indicator of a beneficiary.

10. A non-transitory computer-readable medium having instructions stored thereon, the instructions comprising:
instructions to send a first codetable to a first participant;
instructions to send a second codetable to a second participant;
instructions to receive a first encoded message, a second encoded message, and a plaintext message, wherein the first encoded message is based on the first codetable and the second encoded message is based on the second codetable;
instructions to generate a first ciphertext based at least on the first codetable and the plaintext message;
instructions to compare the first ciphertext to the first encoded message;
instructions to determine an authenticity of the first encoded message based at least on the comparing to the first ciphertext;
instructions to generate a second ciphertext based at least on the second codetable and the plaintext message;
instructions to compare a second ciphertext to the second encoded message;
instructions to determine an authenticity of the second encoded message based at least on the comparing to the second ciphertext;
instructions to send a first confirmation to the first participant based on the authenticity of the first encoded message and the second encoded message and based on a determination that the first and second messages encode the same information; and
instructions to send a second confirmation to the second participant based on the authenticity of the first encoded message and the second encoded message and based on the determination that the first and second messages encode the same information.

11. The non-transitory computer-readable medium of claim 10, wherein the first confirmation comprises an encoded confirmation.

12. The non-transitory computer-readable medium of claim 11, wherein the encoded confirmation is at least partly based on the received plaintext message when the first and second encoded messages are determined to be authentic.

13. The non-transitory computer-readable medium of claim 11, wherein the encoded confirmation is based on a predetermined message when the first or second encoded messages are determined to be inauthentic.

14. The non-transitory computer-readable medium of claim 10, wherein each codetable is used for only one transaction.

15. The non-transitory computer-readable medium of claim 10, further comprising instructions for sending the first and second confirmations to the first participant, and instructions for sending, by the first participant, the second confirmation to the second participant.

16. The non-transitory computer-readable medium of claim 10, wherein the plaintext message includes an amount, a user identifier, an identifier of the first codetable, a first nonce corresponding to the first codetable, and a second nonce corresponding to the second codetable.

17. The non-transitory computer-readable medium of claim 10, wherein the first codetable is sent over a first secure channel and the second codetable is sent over a second secure channel.

18. The non-transitory computer-readable medium of claim 10, wherein the first ciphertext message includes an indicator of an amount.

19. The non-transitory computer-readable medium of claim 18, wherein the first ciphertext message includes an indicator of a beneficiary.

20. A computer-implemented machine for conducting a transaction, comprising:
   a processor; and
   a tangible computer-readable medium operatively connected to the processor and including computer code configured to
      sending a first codetable to a first participant;
      sending a second codetable to a second participant;
      receiving a first encoded message, a second encoded message, and a plaintext message, wherein the first encoded message is based on the first codetable and the second encoded message is based on the second codetable and wherein the plaintext message includes an amount, a user identifier, an identifier of the first codetable, a first nonce corresponding to the first codetable, and a second nonce corresponding to the second codetable;
      generating a first ciphertext based at least on the first codetable and the plaintext message;
      comparing the first ciphertext to the first encoded message;
      determining an authenticity of the first encoded message based at least on the comparing to the first ciphertext;
      generating a second ciphertext based at least on the second codetable and the plaintext message;
      comparing the second ciphertext to the second encoded message;
      determining an authenticity of the second encoded message based at least on the comparing to the second ciphertext;
      sending a first confirmation to the first participant based on the authenticity of the first encoded message and the second encoded message and based on a determination that the first and second messages encode the same information; and
      sending a second confirmation to the second participant based on the authenticity of the first encoded message and the second encoded message and based on the determination that the first and second messages encode the same information.

* * * * *